United States Patent [19]

Anderson et al.

[11] 4,042,032

[45] Aug. 16, 1977

[54] METHODS OF CONSOLIDATING INCOMPETENT SUBTERRANEAN FORMATIONS USING AQUEOUS TREATING SOLUTIONS

[75] Inventors: Buddy W. Anderson, Lafayette, La.; Bobby K. Bowles, Comanche, Okla.; Joseph R. Murphey, Duncan, Okla.; Kenneth D. Totty, Duncan, Okla.; Bill M. Young, Duncan, Okla.

[73] Assignee: Halliburton Company, Duncan, Okla.

[21] Appl. No.: 618,776

[22] Filed: Oct. 2, 1975

Related U.S. Application Data

[63] Continuation-in-part of Ser. No. 367,918, June 7, 1973.

[51] Int. Cl.$^2$ .................... E21B 33/13; E21B 43/04
[52] U.S. Cl. ................................... 166/276; 166/295
[58] Field of Search ............... 166/294, 295, 305 R, 166/276; 61/36 R

[56] References Cited

U.S. PATENT DOCUMENTS

| | | | |
|---|---|---|---|
| 2,378,817 | 6/1945 | Wrightsman et al. | 166/295 |
| 2,792,894 | 5/1957 | Graham et al. | 166/305 R |
| 3,146,829 | 9/1964 | Mann | 166/276 |
| 3,199,590 | 8/1965 | Young | 166/295 |
| 3,209,826 | 10/1965 | Young | 166/280 |
| 3,285,339 | 11/1966 | Walther et al. | 166/295 |
| 3,294,165 | 12/1966 | Meijs et al. | 166/295 |
| 3,297,087 | 1/1967 | Spain | 166/295 |
| 3,301,328 | 1/1967 | Campion | 166/305 R |
| 3,587,742 | 6/1971 | Forrest et al. | 166/295 |
| 3,625,287 | 12/1971 | Young | 166/295 |

*Primary Examiner*—Ernest R. Purser
*Attorney, Agent, or Firm*—Robert S. Nisbett; C. Clark Dougherty, Jr.; John H. Tregoning

[57] ABSTRACT

Methods of consolidating incompetent subterranean formations are provided whereby aqueous treating solutions are utilized to condition the formation, to carry a hardenable organic consolidating fluid into the formation and/or to carry particulated solids coated with a hardenable organic consolidating fluid into the formation and to cause the organic consolidating fluid to harden whereby a hard permeable mass is formed in the formation which prevents the undesirable movement of loose or incompetent sands therein.

93 Claims, No Drawings

METHODS OF CONSOLIDATING INCOMPETENT SUBTERRANEAN FORMATIONS USING AQUEOUS TREATING SOLUTIONS

CROSS-REFERENCE TO RELATED APPLICATION

This is a continuation-in-part of United States Patent Application Ser. No. 367,918 filed June 7, 1973.

Subterranean formations penetrated by well bores often contain loose or incompetent sands which are dislodged when fluids such as oil, gas an water are produced from the formations into the well bores. The presence of such sand particles in the produced fluid is undesirable in that the particles abrade pumping and other producing equipment, and generlly reduce the fluid production capability of the formations. Incompetent subterranean formations are those in which particles making up the formation are bonded together with insufficient bond strength to withstand the forces produced by fluids flowing through the formation to the well bore. As a result, particles are dislodged and flow to the well bore with the fluids. Other subterranean formations include loose sands which are readily entrained by the fluids being produced from the formation.

Various methods of consolidating loose or incompetent sands in subterranean formations have been developed and used heretofore. One such method involves displacing a hardenable organic consolidating fluid into the formation using liquid hydrocarbon displacing solutions so that sands contained in the formation are coated with the organic consolidating fluid. The consolidating fluid is then caused to harden so that the sands are formed into a hard permeable mass. Another method developed and used heretofore involves dispersing a hardenable organic consolidating fluid into a liquid hydrocarbon carrier solution and then introducing the carrier solution into the formation so that the consolidating fluid coats loose or incompetent sands therein. The consolidating fluid is cured to form the sands into a hard permeable mass. Yet another method which has been used heretofore involves dispersing a hardenable organic consolidating fluid in a liquid hydrocarbon carrier solution and then combining a quantity of particulated solids therewith so that the particulated solids are coated with the consolidating fluid. The consolidating fluid-solids-hydrocarbon carrier mixture is introduced into the formation so that the consolidating fluid coated solids are deposited in contact with the formation adjacent the well bore. Upon the hardening of the consolidating fluid, a hard permeable mass is formed between the well bore and the formation so that loose or incompetent sands are prevented from flowing into the well bore with produced fluids. In the latter technique, additional consolidating fluid is often injected into the formation so that loose or incompetent sands contained therein are also consolidated.

While the foregoing methods and techniques have been utilized successfully, they all require the use of liquid hydrocarbon treating fluids. Generally, the formation to be treated is preconditioned using a liquid hydrocarbon treating fluid containing additives for shrinking clays, minimizing emulsions, preventing fluid blocks, etc. The consolidating fluid or consolidating fluid coated particles are then placed into the formation by displacement with liquid hydrocarbon solutions or by liquid hydrocarbon carrier solutions. Such liquid hydrocarbon treating fluids present disposal problems, particularly on off-shore locations, and are hazardous to handle. In addition, and perhaps most importantly, the use of liquid hydrocarbon fluids in treating subterranean formations is costly in that such treatments often involve the loss of portions of the treating fluids to the formation.

Attempts have been made heretofore to substitute aqueous treating fluids for the liquid hydrocarbon treating fluids in the above-described treatments. Such attempts have been unsuccessful due to the general inability of the organic consolidating fluids to coat siliceous materials in the formation being treated in the presence of water and to resist subsequent wash off. Further, attempts to combine organic consolidating fluids with aqueous carrier fluids have been largely unsuccessful due to portions of the consolidating fluid compositions being leached therefrom leaving a very thick gunky resin which is not dispersible in the carrier in a finely divided state, which cannot be pumped effectively in the carrier and which cannot be placed into the formation to be treated, particularly formations of low permeabilities. Also, in prior attempts to utilize aqueous carrier fluids, the resin portion remaining undissolved in the aqueous carrier has been tacky and when deposited on siliceous materials has agglomerated into large sticky masses which can cause damage to the formation permeability. In addition to the foregoing, problems relating to the formation of foams and emulsions have been experienced.

By the present invention, methods of consolidating loose or incompetent sands in subterranean formations using aqueous treating fluids are provided which obviate the above-described problems. Aqueous treating solutions such as readily available formation brines, fresh water, and bay and sea waters can be used. Such aqueous treating fluids are easily handled, present minimal disposal problems, and do not have fire hazard characteristics. The ready availability of aqueous treating fluids results in reduced storage tank requirements at job sites, and eliminates the need for transporting liquid hydrocarbons to off-shore locations. Further, the loss of aqueous treating fluids to the subterranean formation being treated does not materially increase the cost of carrying out the treatment.

The methods of the present invention basically comprise the steps of contacting the formation to be consolidated with an aqueous preflush solution to condition the formation for the acceptance of a hardenable organic consolidating fluid followed by contacting the formation with a hardenable organic consolidating fluid so that at least a portion of the loose or incompetent sands contained therein are coated by the consolidating fluid. The formation is next contacted with a spacer solution so that the hardenable organic consolidating fluid is distributed in the formation and excess consolidating fluid is flushed through the formation whereby permeability in the formation is retained. The consolidating fluid is then caused to harden whereby the coated sands are formed into a hard permeable mass which prohibits the movement of loose or incompetent sands with the production of fluids from the formation into the well bore.

In one aspect of the present invention, the hardenable organic consolidating fluid is displaced into the formation by an aqueous spacer solution followed by an aqueous solution containing a hardening agent.

In another aspect of the present invention, the consolidating fluid is combined with an aqueous carrier solution so that a portion of the consolidating fluid is dissolved and a portion is dispersed as an immiscible phase therein. The resultant consolidating fluid-aqueous carrier solution mixture is introduced into the formation so that the consolidating fluid coats loose or incompetent sands contained therein. Prior to introducing the consolidating fluid-aqueous carrier solution into the formation, an aqueous solution containing a quantity of consolidating fluid coated solid particles can be introduced into the formation to place the coated solids into contact with the formation whereby upon hardening of the consolidating fluid, in addition to consolidating loose or incompetent sands in the formation, a hard permeable pack is formed between the formation and the well bore.

In yet another aspect of the present invention, methods of consolidating loose or incompetent sands in a subterranean formation are provided which are particularly useful in treating formations containing high percentages of acid soluble materials, such as calcium carbonate, dolomite, siderite, etc. These methods include the use of a liquid hydrocarbon spacer solution and a liquid hydrocarbon overflush solution containing a hardening agent, but allow the use of an aqueous preflush solution. Further, if it is desired to form a hard permeable pack between the formation and the well bore, an aqueous carrier solution is utilized to carry resin coated pack sand.

A variety of hardenable organic consolidating fluids can be utilized in accordance with the present invention. Particularly suitable such consolidating fluids are those comprised of a hardenable organic resin and a resin-to-sand coupling agent. The organic resin used is preferably a liquid at 80° F and is cured or hardened by heating or by contact with a hardening agent. Examples of commercially available organic resins which are particularly suitable for use in accordance with the present invention are epoxy resins, phenol-aldehyde resins, furfuryl alcohol resins and urea-aldehyde resins. Of these, furfuryl alcohol resin is the most preferred.

The above-mentioned organic resins are available at various viscosities, depending on the molecular weight of the resin. Preferably, the resin has a viscosity at 80° F in the range of from about 5 to 20,000 centipoises. The most preferred viscosity of the organic resin used in accordance with the present invention is in the range of from about 10 to about 500 centipoises at 80° F. However, resins of higher viscosities can be utilized when mixed or blended with a diluent.

A variety of diluents for controlling the viscosity of the hardenable organic resin can be used in accordance with the present invention. Since the thickness of the resin coating which results on loose or incompetent sands in a formation, the surface area covered per volume of resin and the permeability and strength of the resultant hardened mass are in large part dependent on the viscosity of the resin, it is desirable to closely control the viscosity of the resin. This is accomplished in accordance with the present invention by combining a low viscosity liquid diluent with the resin used. Preferably, the diluent is a monomeric liquid capable of copolymerizing with the resin. Examples of suitable such diluents for epoxy resins are styrene oxide, octylene oxide, furfuryl alcohol, phenols, furfural, liquid monoepoxides derived from the reaction of epichlorohydrine and monohydroxyl compounds such as allyl glycidyl ether, butyl glycidyl ether and phenyl glycidyl ether; and liquid diepoxides such as diglycidyl ether or resorcinol. Examples of such diluents for furfuryl alcohol resins, phenol-aldehyde resins and ureaaldehyde resins include but are not limited to, furfuryl alcohol, furfural, phenol and cresol. Phenols, formaldehydes, furfuryl alcohol and furfural are preferred for use as diluents in accordance with the present invention.

When the consolidating fluid containing a diluent is combined with an aqueous or hydrocarbon carrier solution, a portion of the consolidating fluid is dissolved in the carrier solution and a portion is dispersed in an immiscible phase therein. In addition, a portion of the carrier solution is dissolved in the dispersed consolidating fluid. The quantitative distribution of the consolidating fluid between the dissolved and dispersed phases in the carrier solution is controlled to further achieve desired consolidating fluid viscosity and other properties. The step of controlling the quantitative distribution of the consolidating fluid between the dissolved and dispersed immiscible phases can be accomplished by controlling the particular quantities of consolidating fluid and the carrier solution used, and by controlling the temperature of the resulting consolidating fluid-carrier solution mixture. Another technique for controlling the quantitative distribution between dissolved and dispersed phases is to utilize a highly ionic aqueous carrier solution, i.e., a solution having a relatively high concentration of water soluble inorganic salts dissolved therein, which reduces the solubility of the consolidating fluid. Also, a liquid organic resing diluent can be utilized in the consolidating fluid which has a limited solubility in the aqueous carrier solution used. This control of the quantitative distribution between the dissolved and dispersed phases of the consolidating fluid and of the dispersed consolidating fluid viscosity, brings about superior formation treatment. For example, formations of relatively low permeability which have heretofore been difficult to treat due to the inability of relatively viscous consolidating fluids to penetrate and coat solids in the formation can be effectively treated. Further, a more effective utilization and spreading of a unit volume of consolidating fluid is achieved due to the presence of dissolved consolidating fluid in the carrier solution.

The resin-to-sand coupling agent is utilized in the consolidating fluid to promote coupling or adhesion of the consolidating fluid to sand and other siliceous materials in the formation to be treated. A particularly suitable such coupling agent is an amino silane compound or a mixture of amino silane compounds represented by the following formula:

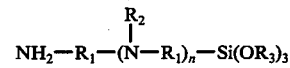

wherein:

$R_1$ is a straight, branched or cyclic chain alkyl radical having in the range of about 1 to about 8 carbon atoms; $R_2$ is hydrogen, an alkyl amine radical or an alkyl radical wherein the alkyl amine and alkyl radical have in the range of from about 1 to about 8 carbon atoms; $R_3$ is a straight or branched chain alkyl radical having in the range of from about 1 to about 3 carbon atoms; and '$n$' is an integer within the range of from zero to about 10.

Examples of the foregoing amino silanes are gamma-aminopropyltriethoxysilane, N-beta-(aminoethyl)-gamma-aminopropyltrimethoxysilane, N-beta-(aminoethyl)-N-beta-(aminoethyl)-gamma-aminopropyltrimethoxysilane, N-beta-(aminopropyl)-N-beta-(aminobutyl)-gamma-aminopropyltriethoxysilane, and di-N-(beta-aminoethyl)-gamma-aminopropyltrimethoxysilane.

Preferred amino silanes are represented by the following general formula:

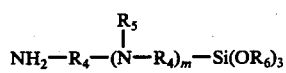

wherein:

$R_4$ is a straight or branched chain alkyl radical having in the range of from about 1 to about 4 carbon atoms; $R_5$ is hydrogen, an alkyl amine radical or an alkyl radical wherein the alkyl amine and alkyl radicals have in the range of from about 1 to about 4 carbon atoms; $R_6$ is an alkyl radical having in the range of from about 1 to about 2 carbon atoms; and '$m$' is an integer in the range of from about 1 to about 4.

Examples of the above amino silanes are N-beta-(aminoethyl)-gamma-aminopropyl-trimethoxysilane, N-beta-(aminoethyl)-N-beta-(aminoethyl)-gamma-aminopropyltrimethoxysilane and N-beta-(aminopropyl)-gamma-aminopropyltriethoxysilane.

The most preferred amino silane compound for use in accordance with the methods of the present invention is N-beta-(aminoethyl)-gamma-aminopropyltrimethoxysilane.

The consolidating fluid is preferably caused to harden by contacting the consolidating fluid with a hardening agent. The hardening agent can be included in the consolidating fluid composition (internal hardening agents) or the consolidating fluid can be contacted with the hardening agent (external hardening agents) after the consolidating fluid has been placed in the subterranean formation being treated. Internal hardening agents are selected such that the consolidating fluid hardens after a period of time sufficient to place the consolidating fluid in the subterranean formation. The most preferred technique for hardening the consolidating fluid placed in a formation in accordance with the methods of the present invention is to introduce an overflush solution containing an external hardening agent into the formation after the consolidating fluid has beed placed therein.

Suitable hardening agents for consolidating fluid compositions containing epoxy resins include but are not limited to, amines such as dimethylaminopropylamine, benzyldimethylamine, diethylaminopropylamine, diethylenetriamine, metaxylene diamine, metaphenylene diamine, diaminodiphenylmethane, piperidine, tridimethylaminomethylphenol; acid anhydride hardening agents such as oxalic anhydride, phthalic anhydride, pyromellitic dianhydride, dodecynyl succinic anhydride, hexahydrophthalic anhydride and methylbicyclo-(2,2,1)-5-heptene-2-3-dicarboxylic anhydride; and polymercaptan hardening agents.

Examples of internal hardening agents which can be used with consolidating fluids containing furfuryl alcohol resin, phenolaldehyde resins and ureau-aldehyde resins are hexachloroacetone, 1,1,3-trichloro-trifluoroacetone, benzotrichloride, benzyl chloride and benzal chloride.

Examples of external hardening agents for consolidating fluids including furfuryl alcohol resin, phenol-aldehyde resins and ureaaldehyde resins are acyl halide compounds such as phthaloyl, fumaryl and benzoyl chloride; halogenated organic acids and acid-producing chemicals such as trichloracetic acid, benzotrichloride, acetic acid, and formic acid; and inorganic acids such as hydrochloric acid. Generally, hardening agents selected from the group consisting of inorganic acids, organic acids and acid-producing chemicals are preferred for use in accordance with the methods of the present invention.

The consolidating fluid compositions preferably also include surfactants which function to improve the resin coating of sand or siliceous materials in an aqueous environment. The surfactants also help prevent the liquid consolidating fluid from becoming excessively tacky and agglomerating in aqueous carrier fluids thereby preventing undesirable gunky masses of resin coated solids which inhibit pumping from occuring. Particularly useful surfactants are cationic surfactants which are known as non-emulsifying surfactants and are commercially available as proprietary blends. When added to consolidating fluids, such surfactants maintain the portion of the consolidating fluid dispersed in the carrier solution from being converted to emulsions. Generally, a low concentration of such surfactants in the consolidating fluid is used, e.g., from about .1 to about 2 parts by weight surfactant per 100 parts by weight organic resin utilized.

Additives can be included in the consolidating fluid which function as dispersing agents, i.e., make the portion of the consolidating fluid dispersed in a carrier solution readily dispersable in a finely divided state. Particularly suitable such additives for facilitating the dispersal of consolidating fluids in aqueous carrier solutions are furfural, diethyl phthalate and mixtures of furfural and diethyl phthalate. These additives function as dispersing agents and prevent the consolidating fluid from becoming excessively tacky during placement into a subterranean formation. The portion of the consolidating fluid whih is dispersed in the aqueous carrier solution can be readily extracted by sand or other siliceous materials in the formation, and since the consolidating fluid is prevented from becoming excessively tacky, agglomeration during pumping does not occur. Also, the finely divided dispersion of the consolidating fluid can be injected into low permeability formations without damaging the permeability of the formation. When brines are utilized as carrier solutions for the consolidating fluids, furfural is preferred as the dispersing agent, and when fresh water is utilized as the carrier solution, a mixture of furfural and diethyl phthalate is preferred.

The aqueous liquids which are useful as aqueous treating solutions in accordance with the methods of the present invention are those which do not contain contaminates which can plug the subterranean formation being treated. These include fresh water, formation brines, sea water and the like. When brines are utilized, those having alkali metal halides, alkaline earth metal halides or mixtures thereof dissolved therein are preferred. It has been found that aqueous treating solutions having high ionic strengths, i.e., solutions containing water soluble inorganic salts at concentrations of from about 5% to about 20% by weight have a greater tendency to allow the extraction of dispersed consolidating fluid therefrom onto siliceous surfaces and have less tendency to wash the consolidating fluid off of such surfaces as compared to low ionic strength aqueous solutions. This is due to the reduction of dispersion stability and resulting increase in dispersion coalescence in aqueous solutions of higher ionic strengths. Thus, brines are preferred for use as the aqueous treating solutions in accordance with the present invention. Small quantities of the above-mentioned non-emulsifying type of cationic surfactants are included in the aqueous solutions to prevent water blocks in the formation being treated, minimize emulsions and cause siliceous surfaces in the formations to readily accept the consolidating fluid in the presence of water, i.e., to render the siliceous surfaces wettable by the consolidating fluid.

In the procedures wherein liquid hydrocarbons are used, diesel oils, kerosenes, petroleum oil crudes, mineral oils and the like can be utilized. Liquid aliphatic or aromatic hydrocarbons having viscosities such that they can readily be injected through a subterranean formation are particularly suitable. Liquid hydrocarbons having a viscosity at 78° F in the range of from about 1 to about 25 centipoises are most preferred for the formations characterized by the lower permeabilities.

As will be understood by those skilled in the art, the consolidating fluids, aqueous treating solutions and liquid hydrocarbon solutions can all include a variety of other additives such as gelling or thickening agents, fluid loss additives, viscosity lowering agents, clay shrinking additives, friction reducing chemicals, etc.

In carrying out the present invention to consolidate loose or incompetent sands contained in a subterranean formation, an aqueous preflush solution is first introduced into the formation to condition the siliceous materials contained therein for the acceptance of the consolidating fluid used. While as stated above, a variety of aqueous fluids can be utilized, a brine comprised of water, a water soluble inorganic salt and a non-emulsifying type of cationic surface active agent is preferably utilized. The inorganic salt can be an alkali metal halide, an alkaline earth metal halide or mixtures thereof, and is preferably present in the aqueous solution in an amount in the range of from about 5% to about 20% by weight, most preferably from about 8% to about 15% by weight. The surface active agent is preferably present in the aqueous solution in an amount in the range of from about .1% to about 2.0% by weight. As the aqueous preflush solution is introduced into the formation, loose and/or incompetent sands contained therein are contacted by the solution and conditioned for the acceptance of the consolidating fluid. Further, the preflush prevents emulsions, water blocks and the like from forming in the formation.

Following the aqueous preflush solution and if the formation being treated has a relatively high premeability, the consolidating fluid can be displaced as a neat consolidating fluid, i.e., in a continuous quantity, directly into the formation so that the consolidating fluid contacts the formation and coats the loose or incompetent sands therein. In this procedure, the consolidating fluid is preferably a liquid composition comprised of a hardenable organic resin selected from the group consisting of epoxy resin, phenol-formaldehyde resin, urea-folmaldehyde resin, furfuryl alcohol resin and mixtures thereof, a monomeric liquid diluent capable of copolymerizing with said resin selected from the group consisting of phenols, formaldehydes, furfuryl alcohol, and furfural present in an amount by weight about equal to the amount of resin used, and an amino silane coupling agent of the type described above present in an amount of from about 0.1 to about 10 parts by weight per 100 parts by weight of the resin. The most preferred consolidating fluid for direct introduction into the formation is a liquid composition comprised of furfuryl alcohol resin, furfural present in an amount in the range from about 50 to about 150 parts by wieght per 100 parts by weight of furfuryl alcohol resin therein, a non-emulsifying cationic surfactant present in an amount of about 1 part by weight per 100 parts by weight of furfural alcohol resin and N-beta-(aminoethyl)-gamma-aminopropyltrimethoxysilane present in an amount of about 1 part by weight per 100 parts by weight of furfuryl alcohol resin.

The consolidating fluid is displaced into the formation by an aqueous spacer solution which also functions to wash excess consolidating fluid from tubular goods disposed in the well bore and to distribute or spread the consolidating fluid into the formation and onto the loose or incompetent sands contained therein. Preferably, the spacer solution is a brine containing one or more of the above-described water soluble inorganic salts in an amount in the range of from about 5% to about 20% by weight, most preferably from about 15% to about 20% by weight, and a non-emulsifying cationic surface active agent present in an amount in the range of from about 0.1% to about 2.0% by weight.

The spacer solution is followed by an aqueous solution containing a hardening agent which causes the consolidating fluid to harden. The hardening agent is preferably an inorganic acid, and the aqueous solution containing the acid is preferably a brine of the same composition as the spacer solution described above. Most preferably, the hardening agent is hydrochloric acid containing in the brine solution in an amount of about 10% by weight. The contact of the consolidating fluid with the hardening agent causes the consolidating fluid to harden and consolidate the loose or incompetent sands contained in the formation into a hard permeable mass.

If the formation to be treated is of relatively low permeability, the consolidating fluid is placed into the formation by an aqueous solution. That is, instead of displacing the consolidating fluid as a neat consolidating fluid, i.e., in a continuous quantity, directly into the formation after the preflush solution, the consolidating fluid is combined with an aqueous carrier solution so that a portion of the consolidating fluid is dissolved therein and a portion is dispersed in an immiscible phase therein. The aqueous carrier solution is preferably a brine containing one or more of the above-described water soluble salts in an amount in the range of from about 5% to about 20% by weight, most preferably from about 8% to about 15% by weight, and containing a non-emulsifying type of cationic surface active agent present in an amount in the range of from about 0.1% to about 2.0% be weight. The consolidating fluid is generally combined with the aqueous carrier solution in an amount in the range of from about 20 to about 200 parts by weight per 100 parts by weight of aqueous carrier solution, but the quantitative distribution of the consolidating fluid between the dissolved and dispersed phases in the carrier solution is controlled to obtain desired viscosity and other properties by utilizing specific quantities of consolidating fluid and carrier solution and controlling the temperature of the resultant mixture. The carrier solution containing dissolved and dispersed consolidating fluid is introduced into the formation so that loose or incompetent sands contained therein are coated by the consolidating fluid. The aqueous spacer solution and aqueous overflush solution containing a hardening agent described above are introduced into the formation following the consolidating fluid-aqueous carrier solution to form the loose sands into a hard permeable mass.

If it is desirable to form a permeable hard mass between the formation and the well bore in addition to consolidating at least a portion of the loose or incompetent sand contained in the formation, a quantity of consolidating fluid coated solid particles can be placed in contact with the formation prior to coating the loose or incompetent sands in the formation with additional consolidating fluid. In carrying out this aspect of the present invention, a brine preflush solution containing a non-emulsifying cationic surface active agent of the composition described above is introduced into the formation whereby the formation is conditioned to accept the consolidating fluid used, etc.

Following the introduction of the aqueous preflush solution, a first aqueous carrier solution of the same composition as the preflush solution containing a quantity of consolidating fluid coated solid particles, e.g., sand, is introduced into the formation so that the consolidating fluid coated particles are placed in contact with the formation adjacent the well bore. In preparing the consolidating fluid-solids-aqueous solution mixture, the consolidating fluid is first combined with the aqueous carrier solution whereby a portion of the consolidating fluid is dissolved in the solution and a portion is dispersed in an immiscible phase therein. The consolidating fluid is preferably dispersed in the aqueous carrier solution within the range of from about 0.5 to about 10 and preferably from about 0.75 to about 1.5 parts by weight consolidating fluid per 10 parts be weight of particulated solids used. A quantity of particulated solids are next introduced into the condolidating fluid-aqueous carrier solution mixture so that the solids are coated with the dispersed portion of the consolidating fluid. The particular quantity of particulated solids combined with the consolidating fluid-aqueous carrier solution mixture depends on the particular consolidating fluid utilized, its affinity for the particulated solid material and the portion of the consolidating fluid dispersed as an immiscible phase in the aqueous carrier solution. In some applications it may be desirable to add sufficient particulate material to attract only a portion of the dispersed consolidating fluid, leaving the remaining dispersed consolidating fluid to be placed in contact with loose or incompetent sands in the formation. If this procedure is used, it may also be desirable to eliminate the introduction of the second consolidating fluid-aqueous carrier solution mixture described below into the formation. A preferred particulated solid material is 20 to 60 mesh (U.S. Standard Sieve Series) sand which is generally mixed with the consolidating fluid-aqueous carrier solution mixture in an amount in the range of from about 3 to about 60, and preferably from about 6 to about 30 parts by weight per 100 parts by weight aqueous carrier solution. The particular concentration of particulated solids which can be mixed with the consolidating fluid-aqueous carrier solution mixture depends on a variety of factors such as the density and size of the particulated material, the viscosity and density of the aqueous carrier solution, the quantity of the consolidating fluid dispersed in the aqueous solution and the flow rate at which the mixture is to be introduced into the formation to be treated.

The quantitative distribution of the consolidating fluid between the dissolved and dispersed immiscible phases is controlled in the manner described above to achieve desired viscosity and other properties. The consolidating fluid-solids-aqueous carrier solution mixture is introduced into the formation so that the consolidating fluid coated solid particles are placed in contact therewith. Excess solids are reverse circulated out of the well bore, and a second aqueous carrier solution containing dissolved and dispersed consolidating fluid is introduced into the formation so that loose or incompetent sands contained in the formation are contacted thereby. The second aqueous carrier solution is preferably a brine having a higher salt content than the preflush and first carrier solutions so that wash off of the consolidating fluid from the placed particulated solids is minimized. Most preferably the second carrier solution has a salt concentration of about 15% by weight. The quantitative distribution of the consolidating fluid between the dissolved and dispersed phases in the second carrier solution is controlled in the same manner as described above.

An aqueous spacer solution is next introduced into the formation to wash excess consolidating fluid from the tubular goods contained in the well bore and distribute and spread the consolidating fluid into the formation and onto the loose or imcompetent sands therein. The spacer solution is followed by an aqueous overflush solution containing a hardening agent so that the consolidating fluid is hardened and a hard permeable mass is formed between the well bore and the formation and a portion of the loose or incompetent sands in the formation are consolidated into a hard permeable mass. The spacer and overflush solutions are preferably brines of the same composition as the second carrier solution described above.

In carrying out the methods of the present invention in relatively low permeability formations containing high percentages of acid soluble materials such as calcium carbonate, dolomite, etc., and where aqueous solutions having high ionic strengths i.e., brines, are not available, liquid hydrocarbon solutions can be substituted for the spacer and overflush solutions described above. Such liquid hydrocarbon solutions resist wash off and acid or acid-forming hardening agents contained therein do not react with acid soluble materials in the formation as readily as do aqueous solutions containing such acids. In this application, an aqueous preflush solution is introduced into the formation so that loose or incompetent sands contained therein are contacted and conditioned for the acceptance of the consolidating fluid to be used. The preflush solution is made up of water containing a non-emulsifier type of cationic surface active agent in an amount of from about 0.1% to about 2.0% by weight.

Following contact of the formation with the preflush solution, an aqueous carrier solution of the same make up and composition as the preflush solution containing dissolved and dispersed consolidating fluid is introduced into the formation whereby loose or incompetent sands contained therein are coated by the consolidating fluid. The placement of the consolidating fluid is followed by a liquid hydrocarbon spacer solution and a liquid hydrocarbon overflush solution containing a hardening agent. Diesel oil containing a cationic surface active agent in an amount of about 0.1% to about 0.5% by weight is most preferred for use as the spacer and overflush solutions. As mentioned above, the liquid hydrocarbon solutions containing acid or acid-forming hardening agents do not react with acid soluble materials in the formation at a rate whereby hardening of the consolidating fluid is hindered or preventing and has less of a tendency to cause wash off of the consolidating fluid as compared to water of low ionic strength, i.e., fresh water.

A preferred consolidating fluid for use in carrying out this procedure is a liquid composition comprised of a hardenable organic resin selected from the group consisting of epoxy resin, phenolformaldehyde resin, furfuryl alcohol resin and urea-formaldehyde resin, a monomeric liquid diluent selected from the group consisting of phenols, formaldehydes, furfuryl alcohol and furfural present in an amount in the range of from about 20 to about 100 parts by weight per 100 parts by weight resin used, and an amino silane compound of the type described above present in an amount of from about 0.1 to about 2 parts by weight per 100 parts by weight resin.

The most preferred consolidating fluid for use in carrying out this procedure is a liquid composition comprised of furfuryl alcohol resin, furfuryl alcohol present in an amount in the range of from about 20 to about 100 parts by weight per 100 parts by weight of furfuryl alcohol resin used, a dispersing additive comprised of a mixture of furfural and diethyl phthalate present in an amount in the range of from about 50 to about 150 parts by weight per 100 parts by weight of resin, an amino silane compound of the type described above present in an amount of from about 0.1% to about 10 parts by weight per 100 parts by weight of resin, and a non-emulsifying cationic surface active agent present in an amount of from about 0.1 to about 2 parts by weight per 100 parts by weight of resin.

If it is desired to place consolidating fluid coated solid particles between the formation and the well bore so that a hard permeable mass is formed adjacent the well bore, in addition to forming a hard permeable mass in the formation, such coated solids are placed using an aqueous carrier solution. In carrying out this procedure, after the consolidating fluid coated solid particles are placed in contact with the formation, additional consolidating fluid is preferably introduced into the formation in a liquid hydrocarbon carrier solution so that loose or incompetent sands in the formation are coated by the consolidating fluid without excessive wash off of the consolidating fluid from the placed solid particles occurring. More specifically, the formation to be treated is first preflushed with an aqueous solution of the type described above, i.e., water containing a cationic surfactant, so that the formation is conditioned for the acceptance of the consolidating fluid utilized. A quantity of the consolidating fluid described above is combined with a quantity of an aqueous carrier solution of the same make-up and composition as the preflush solution so that the consolidating fluid is dissolved and dispersed therein. A quantity of particulated solids are next introduced into the consolidating fluid-aqueous carrier solution mixture so that the solids are coated with dispersed consolidating fluid, and the resultant consolidating fluid-solids-aqueous carrier solution mixture is introduced into the formation so that the coated solids are placed in contact with the formation. Excess solids are reverse circulated out of the well bore, and a liquid hydrocarbon solution, preferably diesel oil containing dissolved and dispersed consolidating fluid is introduced into the formation so that loose or incompetent sands in the formation are coated with consolidating fluid without excessive wash off of consolidating fluid from the placed solids occurring. A diesel oil-surfactant spacer solution is next introduced into the formation followed by a diesel oil-surfactant-hardening agent solution.

The following examples are given to present a clear understanding of and illustrate the present invention:

EXAMPLE I

Furfuryl alcohol resin is tested with surfactants, diluents and various amino silanes to determine the effect of these components on a dispersion of furfuryl alcohol resin in an aqueous carrier liquid. The furfuryl alcohol resin has a viscosity at 25° C in the range of about 240 to 440 centipoises, a specific gravity in the range of about 1.205 to 1.220, a pH in the range of about 4 to 4.8 and an average molecular weight of about 225. One hundred twenty-one grams of the resin are homogeneously mixed with the concentrations of amino silanes, diluents and surfactants indicated in Table I. Five and five-tenths grams of the resin mixtures are then mixed with 0.66 grams of hexachloroacetone, an internal hardening agent for the resin. This mixture is then dispersed in 400 milliliters of an aqueous carrier liquid which is fresh water mixed with five parts by weight sodium chloride per 100 parts by weight water. Forty-eight grams of a 40–60 mesh U.S. Standard Sieve Series white sand is mixed with the dispersion and the mixture is agitated for a period of 30 minutes while heating the mixture at a constant rate from 72° F to 105° F. The sand is then examined to determine if the resin coated the sand. The resin coated sand is then packed in a glass tube having an internal diameter of 0.875 inch to a height of 3½ inches. The aqueous carrier fluid is flushed through the pack to simulate loss of the carrier fluid into a formation and the sample is allowed to harden in a 140° F bath for 24 hours. Samples are then cooled to 80° F and compressive strength measurements are made.

The data in Table I indicates that furfuryl alcohol resin mixed with amino silanes can be dispersed in an aqueous carrier liquid and that the resulting resin composition has an affinity for silica such that the resin composition will form a resin coating on silica surfaces when the resin is brought into contact with the silica.

This data also indicates that a sand pack coated with a mixture of furfuryl alcohol resin and an amino silane can be cured to a high strength matrix and that a surfactant can be added to the resin mixture to improve the compressive strength of a resin coated sand pack.

TABLE I

| Effect of Amino Silane, Diluent and Surfactant on Coating and Strength | | | | |
|---|---|---|---|---|
| Silane grams | Furfural grams | Surfactant* grams | Ability to coat | Compressive Strength After 24 Hrs. — Cure 140° F (PSI 80° F) |
| $NH_2(CH_2)_3Si(OC_2H_5)_3$ | | | | |
| 0.95 | 113 | 0.96 | None | No strength |
| 0.95 | 113 | None | None | No strength |
| 0.95 | None | 0.96 | Good | 1545 |
| 0.95 | None | None | None | No strength |
| $NH_2(CH_2)_2NH(CH_2)_3Si(OCH_3)_3$ | | | | |
| 0.95 | 113 | 0.96 | Good | 1220 |
| 0.95 | 113 | None | Good | 832 |
| 0.95 | None | 0.96 | Good | 2596 |
| 0.95 | None | None | Good | 2402 |
| $NH_2(CH_2)_2NH(CH_2)_2NH(CH_2)_3Si(OCH_3)_3$ | | | | |
| 0.95 | 113 | 0.96 | Good | 1386 |
| 0.95 | 113 | None | Good | 1096 |
| 0.95 | None | 0.96 | Good | 3929 |

TABLE I-continued
Effect of Amino Silane, Diluent and Surfactant on Coating and Strength

| Silane grams | Furfural grams | Surfactant* grams | Ability to coat | Compressive Strength After 24 Hrs. — Cure 140° F (PSI 80° F) |
|---|---|---|---|---|
| 0.95 | None | None | Good | 2593 |
| No Silane | | | | |
| None | 113 | 0.96 | Fair | 100 |
| None | 113 | None | None | No strength |
| None | None | 0.96 | None | No strength |
| None | None | None | None | No strength |

*The surfactant is a proprietary blend of quaternary amines and diluents.

EXAMPLE II

A resin formulation consisting of 121 grams of the furfuryl alcohol resin used in Example I, 113 grams of furfural and the concentration of surfactant shown in Table II are mixed with the silanes shown in Table II to determine the effect of the silanes on the ability of furfuryl alcohol resin to coat on silica particles. This series of tests is conducted in accordance with the procedure described in Example I except that the aqueous carrier fluid was fresh water and no hardening agent is mixed with the resin.

The data in Table II illustrates the coating properties of a resin mixture containing amino silanes. Resins containing amino silanes having at least two amino groups are shown to have good coating properties while an amino silane having one amino group is shown to enhance the coating ability of a resin when added to the resin formulation at a high concentration. Silanes which do not contain amino groups are shown to have no effect on the ability of the resin to coat silica particles unless used in combination with a cationic surfactant. Cationic surfactants are shown to improve the ability of a resin composition containing silanes to coat silica particles.

TABLE II
Effect of Various Silanes on Coating

| Silane grams | Surfactant grams | Ability to Coat |
|---|---|---|
| $CH_3Si(OCH_3)_3$ | | |
| 1.21 | 0.95 | Good |
| 1.21 | None | None |
| 8.47 | None | None |
| $CH_3Si(OC_2H_5)_3$ | | |
| 1.21 | 0.95 | Good |
| 1.21 | None | None |
| 8.47 | None | None |
| $C_5H_{11}Si(OC_2H_5)_3$ | | |
| 1.21 | 0.95 | Good |
| 1.21 | None | None |
| 8.47 | None | None |
| $C_6H_5Si(OC_2H_5)_3$ | | |
| 1.21 | 0.95 | Good |
| 1.21 | None | None |
| 8.47 | None | None |
| $C_2H_3Si(OC_2H_5)_3$ | | |
| 1.21 | 0.95 | Good |
| 1.21 | None | None |
| 8.47 | None | None |
| $C_2H_3Si(CH_3CO_2)_3$ | | |
| 1.21 | 0.95 | Good |
| 1.21 | None | None |
| 8.47 | None | None |
| $HS(CH_2)_3Si(OCH_3)_3$ | | |
| 1.21 | 0.95 | Good |
| 1.21 | None | None |
| 8.47 | None | None |
| 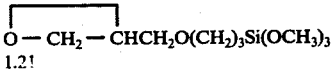 $O-CH_2-CHCH_2O(CH_2)_3Si(OCH_3)_3$ | | |
| 1.21 | 0.95 | Good |
| 1.21 | None | None |
| 8.47 | None | None |
| 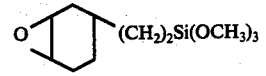 $(CH_2)_2Si(OCH_3)_3$ | | |
| 1.21 | 0.95 | Good |
| 1.21 | None | None |
| 8.47 | None | None |
| $CH_2CCH_3CO_2(CH_2)_3Si(OCH_3)_3$ | | |
| 1.21 | 0.95 | Fair |
| 1.21 | None | None |
| 8.47 | None | None |
| $NH_2(CH_2)_2Si(OC_2H_5)_3$ | | |
| 1.21 | 0.95 | Excellent |
| 1.21 | None | Fair |
| 8.47 | None | Good |
| $NH_2(CH_2)_2NH(CH_2)_3Si(OCH_3)_3$ | | |
| 1.21 | 0.95 | Excellent |
| 1.21 | None | Excellent |
| 8.47 | None | Excellent |
| $NH_2(CH_2)_2NH(CH_2)_2NH(CH_2)_3Si(OCH_3)_3$ | | |
| 1.21 | 0.95 | Excellent |
| 1.21 | None | Excellent |
| 8.47 | None | Excellent |

*The surfactant is a proprietary blend of quaternary amines and diluents.

EXAMPLE III

The compressive strengths of furfuryl alcohol resin coated sand packs prepared in accordance with the procedure described in Example I containing the silanes shown in Table III are measured. The aqueous carrier fluid in this example is fresh water containing 0.25 parts by weight of a proprietary blend of quaternary amines and diluents per 100 parts by weight water. The resin composition is a mixture including 0.95 grams of the silanes indicated in Table III, 121 grams of the furfuryl alcohol resin used in Example I, 113 grams of furfural and 0.96 grams of surfactant.

The data in Table III indicates that silanes which do not have amino groups produce low strength resin coated sand packs and that the strength of a resin coated sand pack increases with the number of amino groups in the silane structure.

TABLE III
Effect of Various Silanes on Strength

| Silane | Compressive Strength After Curing 24 Hours 140° F (PSI 80° F) |
|---|---|
| $CH_3Si(OCH_3)_3$ | <100 |
| $CH_3Si(OC_2H_5)_3$ | <100 |
| $C_5H_{11}Si(OC_2H_5)_3$ | <100 |
| $C_6H_5Si(OC_2H_5)_3$ | <100 |
| $C_2H_3Si(OC_2H_5)_3$ | <100 |
| $C_2H_3Si(OCH_3CO_2)_3$ | <100 |
| $Cl(CH_2)_3Si(OCH_3)_3$ | <100 |
| $HS(CH_2)_3Si(OCH_3)_3$ | <100 |
| 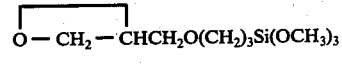 $O-CH_2-CHCH_2O(CH_2)_3Si(OCH_3)_3$ | <100 |
| $(CH_2)_2Si(OCH_3)_3$ (cyclohexyl-O) | |
| $NH_2(CH_2)_3Si(OC_2H_5)_3$ | 590 |
| $NH_2(CH_2)_2NH(CH_2)_3Si(OCH_3)_3$ | 832 |
| $NH_2(CH_2)_2NH(CH_2)_2NH(CH_2)_3Si(OCH_3)_3$ | 1096 |

EXAMPLE IV

The solubility of consolidated fluid dispersed in an aqueous carrier solution is determined at various temperatures. The consolidating fluid compositions are prepared by mixing 49.5 by volume of the furfuryl alcohol resin used in Example I with 49.5 parts by volume furfural, 0.5 parts by volume of N-beta(aminoethyl)-gamma-aminopropyltrimethoxysilane and 0.5 parts by volume of a proprietary blend of cationic surfactants per 100 parts by volume of the resin composition. The aqueous carrier solution is fresh water having dissolved therein eight parts by volume sodium chloride, 0.5 parts by weight calcium chloride, 0.2 parts by weight magnesium chloride and 0.25 parts by volume of a cationic surfactant blend per 100 parts by volume fresh water.

The data in Table IV illustrates the partial solubility of resin compositions dispersed in brine. It can be seen that the solubility of the resin composition in the brine does not increase in proportion to the concentration of resin compositions dispersed in the brine and that greater than about 20 parts by weight resin composition dispersed in the aqueous carrier liquid is required to maintain the viscosity of the resin composition. Therefore, the viscosity of the resin composition is reduced less as the concentration of the resin composition dispersed in the brine is increased. This data also indicates that the aqueous carrier liquid is partially soluble in the liquid resin composition and that the volume of the resin composition can be increased by the aqueous carrier liquid dissolving in the liquid resin composition.

TABLE IV

Viscosity and Distribution of Consolidating Fluid in an Aqueous Phase

| Consolidating Fluid, Parts by Vol. Resin Mix Per 100 Parts of Resin-Brine Mixture | Temperature of Fluids °F | Parts by Vol. Resin per 100 Parts Resin Mix Dissolved in Brine | Viscosity of Resin Which Did Not Dissolve in Brine (cps) |
|---|---|---|---|
| 5 | 105 | — | — |
| 10 | 105 | 60 | 1000 |
| 20 | 105 | 27 | 32 |
| 30 | 105 | —(12) goes into resin | 37 |
| 5 | 140 | — | — |
| 10 | 140 | 57 | 1000 |
| 20 | 140 | 22 | 40 |
| 30 | 140 | 20 | 46 |
| 5 | 200 | — | — |
| 10 | 200 | 52 | 813 |
| 20 | 200 | 23 | 58 |
| 30 | 200 | 20 | 40.5 |

EXAMPLE V

The compressive strength and permeability of a sand pack consolidated with the resin used in Example IV and heated to 200° F are determined. After the resin composition dispersed in the brine and containing 20 parts and 30 parts by weight resin per 100 parts by weight of the resin brine mixture are heated to 200° F and the solubilities determined by the procedures described in Example IV, the dispersions are flushed through a pack of brine wet sand to coat the resin on the sand pack. The sand pack is 70 to 170 mesh U.S. Standard Sieve Series white sand packed in a glass tube having an internal diameter of 0.875 inch and a height of 3.5 inches. The resin is cured by flushing 200 cc of 7½% aqueous solution of hydrochloric acid in fresh water heated to 200° F through the sand pack. The aqueous solution used to harden the resin composition includes 0.1% of an acid inhibitor to reduce the corrosiveness of the acid to the metal components in the test system. The consolidated sand pack is cured for 16 hours at 200° F and then cooled to room temperature for measuring the permeability and compressive strength.

The data in Table V indicates that a resin composition dispersed in an aqueous carrier liquid can be flushed through a sank pack to consolidate the sand pack into a permeable matrix. The strength of the consolidated matrix and the permeability of the consolidated matrix are increased by increasing the concentration of the resin composition dispersed in the aqueous carrier liquid.

TABLE V

Strength and Permeability of a Sand Pack Consolidated With Resin Dispersed in Brine

| Resin (Parts) by Weight per 100 Parts by Weight Resin-Brine Mixture | Compressive Strength After Curing 16 Hrs. 200° F — (PSI 80° F) | Permeability | |
|---|---|---|---|
| | | Top (darcies) | Bottom (darcies) |
| 20 | 1430 | 3.35 | 2.6 |
| 30 | 1633 | 4.6 | 3.15 |

EXAMPLE VI

The ability of epoxy and phenol-formaldehyde resin compositions to coat silica particles and the strength of a pack of the resin coated particles is determined. The procedures described in Example I are used. The phenol-formaldehyde resin has a viscosity at 100° F of about 1000 centipoises and a pH of about 6.8. The epoxy resin has a viscosity at 80° F of about 100 to 160 centipoises and contains no diluents. The hardening agent for the epoxy resin is proprietary polymercaptan. The hardening agent for the phenol-formaldehyde resin is hexachloroacetone. The diluent for the epoxy and phenol-formaldehyde resin is furfural. The silane for both resins is N-beta (aminoethyl)gamma-aminopropyltrimethoxysilane.

The data in this table indicates that epoxy resin compositions and phenol-formaldehyde resin compositions can be dispersed in aqueous carrier fluids and that the resin compositions dispersed in the aqueous carrier fluids have an affinity for silica surfaces such that they will form coatings on the silica surfaces. This data also indicates that epoxy and phenolformaldehyde resin compositions containing amino silanes having at least two amino groups will form coatings on sand particles such that a pack of the resin coated sand particles will have high strengths after hardening.

TABLE VI

Effect of Diluent, Silane and Surfactant on the Coating and Strength of Epoxy and Phenol-formaldehyde Resins

| Resin (gms) | Curing Agent (gms) | Diluent (gms) | Silane (gms) | Surfactant* (gms) | Ability to Coat | Compressive Strength After 24 Hrs. Cure 175° F (PSI 80° F) |
|---|---|---|---|---|---|---|
| Epoxy | | | | | | |
| 116.4 | 120 | 113 | .95 | .96 | Good | 750 |
| 116.4 | 120 | 113 | None | .96 | Good | 100 |
| 116.4 | None | 113 | None | None | Good | No strength |
| 116.4 | None | None | None | None | None | No strength |

TABLE VI-continued
Effect of Diluent, Silane and Surfactant on the Coating and Strength of Epoxy and Phenol-formaldehyde Resins

| Resin (gms) | Curing Agent (gms) | Diluent (gms) | Silane (gms) | Surfactant* (gms) | Ability to Coat | Compressive Strength After 24 Hrs. Cure 175° F (PSI 80° F) |
|---|---|---|---|---|---|---|
| Phenol-formaldehyde Resin | | | | | | |
| 121 | 16 | 113 | .95 | .96 | Good | 2288 |
| 121 | 16 | 113 | .96 | None | Good | 5160 |
| 121 | 16 | 113 | None | None | Good | 100 |

*The surfactant is a proprietary blend of quaternary amines and diluents.

EXAMPLE VII

A furfuryl alcohol resin composition containing 121 grams of the furfuryl alcohol resin used in Example I. 0.95 grams of N-beta-(aminoethyl)-gamma-aminopropyltrimethoxysilane, 0.96 grams of surfactant shown in Table VII, and 113 grams of furfural is tested with various surfactants. 5.5. grams of the resin composition are mixed with 0.66 grams of hexachloroacetone, and internal hardening agent for the resin. The resin composition is dispersed in 400 milliliters of a 5% sodium chloride brine. 48 grams of white sand having a particle size of 40–60 mesh U.S. Standard Sieve Series are mixed with the dispersion to coat the resin on the sand particles. The sand particles are then packed in a glass tube and the strengths are determined by the procedures described in Example I.

The data in Table VII indicates the surfactants can be included in the resin composition to increase the strength of a resin coated sand pack. This data also indicates that additional surfactant added to the carrier fluid can reduce the strength of a resin coated sand pack.

TABLE VII
Effect of Surfactants on the Strength of a Resin Coated Sand Pack

| Surfactant Added | Additional Surfactant Added to the Carrier Fluid (cc) | 80° F. Compressive Strength Results, PSI After 24 Hrs. Cure at 140° F |
|---|---|---|
| None | None | 812 |
| Anionic | | |
| 3N | None | 1136 |
|  | 1 | 277 |
| Cationic | | |
| 5N | None | 1220 |
|  | 1 | 623 |
| 9N | None | 821 |
|  | 1 | 612 |
| 10N | None | 364 |
|  | 1 | 416 |
| 11N | None | 1248 |
|  | 1 | 311 |
| 12N | None | 1025 |
|  | 1 | 225 |
| 13N | None | 1268 |
|  | 1 | 1043 |
| 14N | None | 812 |
|  | 1 | Unset |
| 15N | None | 966 |
|  | 1 | 100 |
| 16N | None | 1321 |
|  | 1 | 398 |
| Myristyl dimethyl Benzyl Ammonium Chloride | None | 754 |
|  | 1 | Unset |
| DOC-3 | None | 1229 |
|  | 1 | Resin did not coat sand |

*The surfactants listed by code name are proprietary blends of surfactants.

EXAMPLE VIII

Various concentrations of a cationic surfactant are added to resin compositions containing amino silanes to determine the effect of surfactant concentration on the ability of the resin composition dispersed in an aqueous carrying fluid to coat silica particles. The ability to coat the silica particles is determined by measuring the strength of a pack of the particles in accordance with the procedure described in Example I. The resin composition is prepared by mixing 121 grams of the furfuryl alcohol resin used in Example I with 113 grams of furfural and 0.95 grams of the silane shown in Table VIII. Five and five-tenths grams of the resin composition is then mixed with the concentration of surfactant shown in Table VIII and 0.66 grams of hexachloroacetone, an internal hardening agent for the resin composition. This mixture is then dispersed in 400 milliliters of a 5% sodium chloride brine solution. Forty-eight grams of 40–60 mesh U.S. Standard Sieve Series white sand is then mixed with the dispersion to coat the resin on the sand. The coated sand is then packed in a glass tube and compressive strengths are determined by the procedures described in Example I.

The data in Table VIII indicates that cationic surfactants can increase the resulting strength of a resin coated sand pack. However, the concentration is critical and high concentrations of surfactant reduce the strength of a pack of resin coated sand particles.

TABLE VIII
Effect of Surfactant Concentration on the Strength of a Pack of Resin Coated Silica Particles

| Silane | 5N (gm) | 80° F Compressive Strength PSI After 24 Hrs. Cure 140° F |
|---|---|---|
| $NH_2(CH_3)_3Si(OC_2H_5)_3$ | | |
|  | .0275 | None[1] |
|  | .055 | None[1] |
|  | .110 | None[2] |
|  | .2035 | None[2] |
|  | .220 | 1136 |
|  | .275 | 450 |
| $NH_2(CH_2)_2NH(CH_2)_3Si(OCH_3)_3$ | | |
|  | 0 | 832 |
|  | .0275 | 1173 |
|  | .055 | 1220 |
|  | .165 | 1361 |
|  | .275 | 754 |
|  | .550 | 504 |
| $NH_2(CH_2)_2NH(CH_2)_2NH(CH_2)_3(Si(OCH_3)_3$ | | |
|  | 0 | 1096 |
|  | .0275 | 1448 |
|  | .055 | 1396 |

[1]The resin did not coat the sand.
[2]The resin initially coated the sand, but some washed off during the agitation period.

EXAMPLE IX

A furfuryl alcohol resin composition containing 121 grams of the furfuryl alcohol resin used in Example I, 0.95 grams of N-beta-(aminoethyl)-gamma-aminopropyltrimethoxysilane, 113 grams of furfural and 0.96 grams of cationic surfactant is dispersed in the aqueous solutions shown on Table IX, and the ability of the resin to coat is determined in accordance with the procedures described in Example I.

The data in Table IX indicates that a resin composition comprising a curable organic resin and an amino silane can be dispersed in a variety of aqueous solutions and maitains its affinity for silica surfaces, i.e., the resin composition will coat the silica surfaces when placed in contact therewith. This data indicates that aqueous liquids containing acids can have deleterious effects on the ability of the resin dispersed in the aqueous liquid to coat silica surfaces.

TABLE IX
Effect of Various Components on the Ability of Resin to Coat Silica Surfaces

| Aqueous Solution | Ability of the Resin To Coat Sand |
|---|---|
| Fresh water | Good |
| Fresh water + 2% KCl | Good |
| Fresh water + 5% NaCl | Good |
| Fresh water + 15% NaCl | Good |
| Fresh water + 2% CaCl$_2$ | Good |
| Fresh water + 10% CaCl$_2$ | Good |
| Fresh water + 20% CaCl$_2$ | Good |
| Standard brine[1] | Good |
| Sea brine[2] | Good |
| Fresh water + trace of NaOH | Good |
| Fresh water + trace of KoH | Good |
| Fresh water + sodium bicarbonate | Good |
| Fresh water + guanidine carbonate | Good |
| Fresh water + 2% HCl | None |
| Fresh water + 2% acetic acid | None |
| Fresh water + 2% citric acid | None |
| Fresh water + 2% maleric acid | None |
| Fresh water + 2% oxalic acid | None |

[1]Standard brine consists of water, NaCl, CaCl$_2$, and MgCl$_2 \cdot$ 6H$_2$O mixed in the respective weight ratios of 240:18.1:1.34:1.
[2]This sea brine is 41.95 grams of sea salt dissolved in sufficient fresh water to produce one liter of solution. Sea salt is a mixture of 58.49 parts by weight NaCl; 26.46 parts by weight MgCl$_2 \cdot$ 6H$_2$O: 9.75 parts by weight NaSO$_4$; 2.765 parts by weight CaCl$_2$; 1.645 parts by weight KCl; 0.477 parts by weight NaHCO$_3$; 0.238 parts by weight KBr; 0.071 parts by weight H$_3$BO$_3$; 0.095 parts by weight SrCl$_2 \cdot$ 6H$_2$O; and 0.007 parts by weight NaF per 100 parts by weight sea salt.

EXAMPLE X

The solubility of furfuryl alcohol in a brine solution comprised of 240 parts by weight water, 18.1 parts by weight NaCl, 1.34 parts by weight CaCl$_2$ and 1 part by weight MgCl$_2 \cdot$ 6H$_2$O at various temperatures is illustrated by the data given in Table X.

TABLE X
Solubility of Furfuryl Alcohol in Brine at Various Temperatures

| Temperature ° F | Solubility of Furfuryl Alcohol % by Volume |
|---|---|
| 80 | 8 |
| 100 | 20 |
| 120 | 30 |
| 140 | 36 |
| 160 | 42 |
| 180 | 44 |
| 200 | 49 |

From the foregoing data it can be seen that the solubility of furfuryl alcohol in brine can be controlled by controlling the temperature of the brine-furfuryl alcohol mixture.

EXAMPLE XI

A consolidating fluid comprised of furfuryl alcohol resin and furfuryl alcohol in equal parts by volume is added to the brine solution described in Example X in controlled quantities at controlled temperatures. Before and after mixing, the volume of consolidating fluid is measured and the quantitative distribution of dissolved and dispersed phases determined. The results of these tests are shown in Table XI below:

TABLE XI
QUANTITATIVE DISTRIBUTION OF FURFURYL ALCOHOL RESIN CONSOLIDATING FLUID IN BRINE

| Test Temperature, ° F | Quantity of Consolidating Fluid Mixed With Brine, % by Volume In Mixture | Quantity of Consolidating Fluid Dissolved in Brine, % by Volume of Original Consolidating Fluid | Quantity of Consolidating Fluid Dispersed As An Immiscible Phase in Brine, % by Volume of Original Consolidating Fluid |
|---|---|---|---|
| 160 | 20.0 | 35 | 65 |
| 160 | 22.5 | 30 | 70 |
| 160 | 25.0 | 25 | 75 |
| 160 | 28.0 | 18 | 82 |
| 160 | 30.0 | 13 | 87 |
| 160 | 33.0 | 5 | 95 |

From the data presented in Table XI, the control of the quantitative distribution of consolidating fluid in brine by controlling the quantitative ratio of consolidating fluid to brine used and the temperature of the mixture is illustrated.

Example XII

The solubility of furfuryl alcohol in diesel oil (No. 2 standard commercial grade) at various temperatures is illustrated in Table XII:

TABLE XII
SOLUBILITY OF FURFURYL ALCOHOL IN DIESEL OIL AT VARIOUS TEMPERATURES

| Temperature, ° F | Solubility of Furfuryl Alcohol % by Volume in Oil |
|---|---|
| 80 | 1.0 |
| 130 | 4.76 |
| 150 | 9.1 |
| 160 | 13.0 |
| 170 | 16.7 |
| 180 | 23.1 |
| 190 | 31.0 |
| 200 | 41.2 |
| 209 | 52.4 |

From the data presented in Table XII, it can be seen that the solubility of furfuryl alcohol in diesel oil can be effectively controlled by controlling the temperature at which the furfuryl alcohol-diesel oil mixture exists.

EXAMPLE XIII

A consolidating fluid comprised of furfuryl alcohol resin and furfuryl alcohol in equal parts by volume is added to diesel oil in controlled quantities at controlled temperatures. Before and after mixing, the volume of consolidating fluid is measured and the quantitative distribution of dissolved and dispersed phases determined. The results of these tests are shown in Table XIII below:

TABLE XIII

QUANTITATIVE DISTRIBUTION OF FURFURYL ALCOHOL RESIN CONSOLIDATING FLUID IN DIESEL OIL[1]

| Test Temperature, °F | Quantity of Consolidating Fluid Mixed With Diesel Oil, % by Volume In Mixture | Quantity of Consolidating Fluid Dissolved in Oil, % by Volume of Original Consolidating Fluid | Quantity of Consolidating Fluid Dispersed As An Immiscible Phase in Oil, % by Volume of Original Consolidating Fluid |
|---|---|---|---|
| 80 | 4.1 | 5.7 | 94.3 |
| 105 | 4.1 | 20.2 | 79.8 |
| 126 | 4.1 | 26.5 | 73.5 |
| 175 | 4.1 | 46.0 | 54.0 |
| 80 | 7.9 | 2.2 | 97.8 |
| 105 | 7.9 | 4.7 | 95.3 |
| 126 | 7.9 | 8.0 | 92.0 |
| 175 | 7.9 | 36.7 | 63.3 |
| 80 | 12.5 | 0.9 | 99.1 |
| 105 | 12.5 | 0.9 | 99.1 |
| 126 | 12.5 | 1.9 | 98.1 |
| 175 | 12.5 | 16.9 | 83.1 |

[1]No. 2 standard commercial grade diesel oil.

From the data presented in Table XIII, the control of the quantitative distribution of consolidating fluid in diesel oil by controlling the quantitative ratio of consolidating fluid to oil used and the temperature of the mixture is illustrated.

EXAMPLE XIV

Various quantities of a consolidating fluid comprised of 3.3 parts by volume furfuryl alcohol resin, 1 part by volume furfuryl alcohol, 1 part by volume furfural and 1.4 parts by volume diethyl phthalate are mixed with the aqueous solutions given in Table XIV at the temperatures indicated and the viscosities of the dispersed phases of the consolidating fluid are determined.

From Table XIV it can be seen that the viscosity of the portion of consolidating fluid dispersed in various aqueous solutions can be effectively controlled by varying the quantitative ratio of aqueous solution to consolidating fluid and the temperature of the resultant mixture.

TABLE XIV

| Consolidating Fluid, % by Volume Mixed With Aqueous Solution | Viscosity of Undissolved Consolidating Fluid[3], cps. | | | | | |
|---|---|---|---|---|---|---|
| | Fresh Water | | Standard Brine[1] | | NaCl Brine[2] | |
| | 75° F | 180° F | 75° F | 180° F | 75° F | 180° F |
| 10 | 463 | 15.2 | 276 | 19 | | |
| 20 | 131 | 11.5 | 81 | 10 | 57.5 | 10 |
| 30 | 80 | 8.2 | 80 | 10 | | |

[1]A synthetic brine solution consisting of 240 parts by weight water, 18.1 parts by weight NaCl$_2$, 1.34 parts by weight CaCl$_2$, and 1 part by weight MgCl$_2$ · 6H$_2$O.
[2]15% by weight NaCl
[3]The viscosities of the consolidating fluid prior to mixing with aqueous solutions are 43 cps. at 75° F and 5.7 cps. at 180° F.

EXAMPLE XV

The dispersibility and placement properties of the various consolidating fluid compositions shown in Table XV are determined by observation in fresh water and brine. Ten (10) c.c. portions of the consolidating fluids are mixed with 100 c.c. portions of fresh water and brine at the temperatures indicated.

TABLE XV

DISPERSIBILITY AND PLACEMENT PROPERTIES OF CONSOLIDATING FLUIDS IN FRESH WATER AND BRINE

| Consolidating Fluid Composition, Pbv. | | | | Temp. °F | Dispersibility & Placement Properties In | |
|---|---|---|---|---|---|---|
| Furan Resin | Furfuryl Alcohol | Furfural | Diethyl Phthalate | | Fresh H$_2$O | Brine* |
| 33 | 10 | — | — | 75 | Dispersibility - poor; resin quickly agglomerated into larger masses (gunky). Excessive sticking to glass container; considered unpumpable. | Same as described for fresh water; considered unpumpable. |
| 33 | — | 10 | — | 75 | Dispersibility - poor; resin quickly agglomerated into larger masses (gunky). Excessive sticking to glass container; considered unpumpable. | Same as described for fresh water; considered unpumpable |
| 33 | 10 | 10 | — | 75 | Dispersibility - poor to fair; resin agglomerated to the extent stirrer became heavily coated with thick resin; considered unpumpable. | Dispersibility - good; dispersed resin particles were finely divided; considered pumpable. |
| 33 | 10 | 10 | 14 | 75 | Dispersibility - excellent, dispersed resin particles were very finely divided; considered pumpable. | Same as described for fresh water; considered pumpable. |
| 33 | 10 | — | 14 | 75 | Dispersibility - good; resin particles were dispersed in a finely divided state; considered pumpable. | Same as described for fresh water; considered pumpable. |
| 33 | — | 10 | 14 | 75 | Dispersibility - good; resin particles | Same as described for fresh |

TABLE XV-continued
DISPERSIBILITY AND PLACEMENT PROPERTIES OF CONSOLIDATING FLUIDS IN FRESH WATER AND BRINE

| Consolidating Fluid Composition, Pbv. | | | | | Dispersibility & Placement Properties In | |
|---|---|---|---|---|---|---|
| Furan Resin | Furfuryl Alcohol | Furfural | Diethyl Phthalate | Temp. °F | Fresh H₂O | Brine* |
| | | | | | were dispersed in a finely divided state; considered pumpable. | water; considered pumpable. |
| 33 | 34 | — | — | 75 | Dispersibility - poor; resin quickly agglomerated into larger highly viscous masses; excessive sticking of resin to glass container occurred; considered unpumpable. | Same as described for fresh water; considered unpumpable. |
| 33 | — | 34 | — | 75 | Dispersibility - fair; some thickening of resin occurred during disperson tests along with some resin sticking to stirrer; pumpability - questionable. | Dispersibility - good; dispersed resin particles appeared finely divided; considered pumpable. |
| 33 | — | — | 34 | 75 | Dispersibility - good; resin tended to emulsify with water; considered unpumpable as such. | Dispersibility - excellent; dispersed resin particles were finely divided; resin remained thin; considered pumpable. |
| 33 | 14.7 | 14.7 | 20.6 | 180 | Dispersibility - excellent; dispersed resin particles were finely divided; resin mix remained thin; considered pumpable. | |
| 33 | 10 | 10 | 14 | 180 | Dispersibility - excellent; dispersed resin particles were finely divided; resin mix remained thin; considered pumpable. | Dispersibility - excellent; dispersed resin particles were finely divided; resin remained thin; considered pumpable. |
| 33 | 34 | — | — | 180 | Dispersibility - poor; resin mix tended to thicken and agglomerate into larger masses; considered unpumpable. | |

*A synthetic brine solution consisting of 240 Pbv water; 18.1 Pbv NaCl; 1.34 Pbv CaCl₂; and 1Pbv MgCl₂·6H₂O From Table XV it can be seen that furfural and diethyl phthalate function as dispersing agents and improve pumpability when combined with various consolidating fluids dispersed in aqueous solutions.

We claim:
1. A method of consolidating loose or incompetent sands in a formation penetrated by a well bore comprising the steps of:
   contacting said formation with an aqueous preflush solution to condition said formation for the acceptance of a hardenable organic consolidating fluid capable of coating sand in an aqueous environment;
   contacting said formation with said hardenable organic consolidating fluid so that at least a portion of said loose or incompetent sands are coated thereby;
   contacting said formation with a spacer solution so that said hardenable organic consolidating fluid is distributed therein; and
   causing said consolidating fluid to harden thereby forming a hard permeable mass in said formation.

2. The method of claim 1 wherein said spacer solution is an aqueous solution.

3. The method of claim 2 wherein said consolidating fluid is a liquid composition comprised of a hardenable organic resin and a resin-to-sand coupling agent.

4. The method of claim 3 wherein said hardenable organic resin is selected from the group consisting of epoxy resin, phenol-aldehyde resin, furfuryl alcohol resin, urea-aldehyde resin and mixtures thereof.

5. The method of claim 4 wherein said hardenable organic resin is furfuryl alcohol resin.

6. The method of claim 4 wherein said coupling agent is an amino silane compound or a mixture of amino silane compounds represented by the following formula:

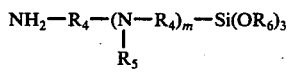

wherein;

$R_4$ is a straight or branched chain alkyl radical having in the range of from about 1 to 4 carbon atoms; $R_5$ is hydrogen, an alkyl amine radical or an alkyl radical wherein the alkyl amine and alkyl radicals have in the range of about 1 to 4 carbon atoms;

$R_6$ is alkyl radical having in the range of about 1 to 2 carbon atoms; and 'm' is an integer in the range of about 1 to 4.

7. The method of claim 6 wherein said silane compound is N-beta-(aminoethyl)-gamma-aminopropyl-trimethoxysilane.

8. The method of claim 6 wherein said amino silane compound is present in said consolidating fluid in an amount in the range of about 0.1 about 10 parts by weight per 100 parts by weight of said organic resin.

9. The method of claim 6 wherein said consolidating fluid is further characterized to include a monomeric resin diluting liquid capable of copolymerizing with said organic resin selected from the group consisting of phenols, formaldehydes, furfuryl alcohol and furfural.

10. The method of claim 9 wherein said monomeric liquid is furfural.

11. The method of claim 9 wherein said amino silane compound is present in said consolidating fluid in an amount in the range from about 0.1 to about 10 parts by weight per 100 parts by weight by said organic resin, and said monomeric liquid is present in said consolidating fluid in an amount in the range from about 50 to about 150 parts by weight per 100 parts by weight of said organic resin.

12. The method of claim 6 wherein the step of causing the consolidating fluid to harden comprises contacting said formation with an aqueous solution containing a hardening agent.

13. The method of claim 12 wherein said preflush solution, said spacer solution and said solution containing a hardening agent are comprised of water, a water soluble inorganic salt and a non-emulsifying cationic surface active agent.

14. The method of claim 13 wherein said water soluble inorganic salt is an alkali metal halide, an alkaline earth metal halide, or mixtures thereof, and is present in each of said solutions in an amount in the range of from about 5% to about 20% by weight of said solutions.

15. The method of claim 14 wherein said hardening agent is selected from the group consisting of inorganic acids, organic acids and acid forming chemicals.

16. The method of claim 1 wherein the step of contacting said formation with said hardenable organic consolidating fluid comprises:
  combining said consolidating fluid with an aqueous carrier solution so that a portion of said consolidating fluid is dissolved in said solution and a portion of said consolidating fluid is dispersed in an immiscible phase in said solution; and
  introducing the resultant consolidating fluid-aqueous solution mixture into said formation.

17. The method of claim 16 wherein said spacer solution is an aqueous solution.

18. The method of claim 17 wherein said hardenable resin is selected from the group consisting of epoxy resin, phenolaldehyde resin, urea-aldehyde resin, furfuryl alcohol resin, and mixtures thereof.

19. The method of claim 18 wherein said hardenable organic resin is furfuryl alcohol resin.

20. The method of claim 18 wherein said coupling agent is an amino silane compound or a mixture of amino silane compounds represented by the following formula:

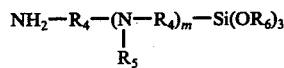

wherein:
  $R_4$ is a straight or branched chain alkyl radical having in the range of from about 1 to 4 carbon atoms; $R_5$ is hydrogen, an alkyl amine radical or an alkyl radical wherein the alkyl amine and alkyl radicals have in the range of about 1 to 4 carbon atoms;
  $R_6$ is an alkyl radical having in the range of about 1 to 2 carbon atoms; and 'm' is an integer in the range of about 1 to 4.

21. The method of claim 20 wherein said amino silane is N-beta-(aminoethyl)-gamma-aminopropyltrimethoxysilane.

22. The method of claim 20 wherein said amino silane compound is present in said consolidating fluid in an amount in the range of from about 0.1 to about 10 parts by weight per 100 parts by weight of said organic resin.

23. The method of claim 20 wherein said consolidating fluid is further characterized to include a monomeric resin diluting liquid capable of copolymerizing with said organic resin selected from the group consisting of phenols, formaldehydes, furfuryl alcohol and furfural.

24. The method of claim 23 wherein said monomeric liquid is furfural.

25. The method of claim 23 wherein said amino silane compound is present in said consolidating fluid in an amount in the range of about 0.1 to about 10 parts by weight per 100 parts by weight of said organic resin, and said monomeric liquid is present in said consolidating fluid in an amount in the range of from about 50 to about 150 parts by weight per 100 parts by weight of said organic resin.

26. The method of claim 20 wherein the step of causing the consolidating fluid to harden comprises contacting said formation with an aqueous solution containing a hardening agent.

27. The method of claim 26 wherein said preflush solution, said spacer solution, said carrier solution and said solution containing a hardening agent are comprised of water, a water soluble inorganic salt and a non-emulsifying cationic surface active agent.

28. The method of claim 27 wherein said water soluble inorganic salt is an alkali metal halide, an alkaline earth metal halide, or mixtures thereof, and is present in each of said solutions in an amount in the range of from about 5% to about 20% by weight of said solutions.

29. The method of claim 28 wherein said hardening agent is selected feom the group consisting of inorganic acids, organic acids and acid forming chemicals.

30. The method of claim 23 which is further characterized to include the step of controlling the quantitative distribution of said consolidating fluid in said aqueous carrier solution between the dissolved and dispersed immiscible phases thereof.

31. The method of claim 30 wherein the step of controlling the quantitative distribution of said consolidating fluid between the dissolved and dispersed immiscible phases thereof comprises controlling the quantitative ratio of consolidating fluid to aqueous carrier solution used.

32. The method of claim 31 wherein the step of controlling the quantitative distribution of said consolidating fluid between the dissolved and dispersed phases thereof is further characterized to include the step of controlling the temperature of the resultant consolidating fluid-aqueous carrier solution mixture.

33. The method of claim 32 wherein said hardenable organic resin is furfuryl alcohol resin.

34. The method of claim 33 wherein said monomeric resin diluting liquid is furfural.

35. The method of claim 34 wherein said furfuryl alcohol resin-furfural alcohol consolidating fluid is further characterized to include a dispersing agent selected from the group consisting of furfural, diethyl phthalate and mixtures thereof.

36. A method of consolidating loose or incompetent sands in a formation penetrated by a well bore comprising the steps of:
  contacting said formation with an aqueous preflush solution to condition said formation for the acceptance of a hardenable organic consolidating fluid capable of coating sand in an aqueous environment;
  placing a quantity of particulated solids coated with said hardenable organic consolidating fluid into contact with said formation so that upon the hardening of said consolidating fluid a hard permeable pack is formed between said formation and said well bore;
  contacting said formation with said hardenable organic consolidating fluid so that at least a portion of said loose or incompetent sands are coated thereby;
  contacting said formation with a spacer solution so that said hardenable organic consolidating fluid is distributed therein; and
  causing said consolidating fluid to harden thereby forming said hard permeable pack between said formation and said well bore and a hard permeable mass in said formation.

37. The method of claim 36 wherein said spacer solution is an aqueous solution.

38. The method of claim 36 wherein said consolidating fluid is a liquid composition comprised of a hardenable organic resin and a resin-to-sand coupling agent.

39. The method of claim 38 wherein said hardenable organic resin is selected from the group consisting of epoxy resin, phenol-aldehyde resin, urea-aldehyde resins, furfuryl alcohol resin, and mixtures thereof.

40. The method of claim 39 wherein said hardenable organic resin is furfuryl alcohol resin.

41. The method of claim 39 wherein said coupling agent is an amino silane compound or a mixture of amino silane compounds represented by the following formula:

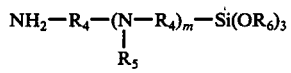

wherein;
R₄ is a straight or branched chain alkyl radical having in the range of from about 1 to 4 carbon atoms; R₅ is hydrogen, an alkyl amine radical or an alkyl radical wherein the alkyl amine and alkyl radicals have in the range of from about 1 to 4 carbon atoms;
R₆ is an alkyl radical having in the range of from about 1 to 2 carbon atoms; and 'm' is an integer in the range of from about 1 to 4.

42. The method of claim 41 wherein said amino silane is N-beta-(aminoethyl)-gamma-aminopropyltrimethoxysilane.

43. The method of claim 41 wherein said amino silane compound is present in said consolidating fluid in an amount in the range of from 0.1 to about 10 parts by weight per 100 parts by weight of said organic resin.

44. The method of claim 41 wherein said consolidating fluid is further characterized to include a monomeric resin liquid capable of copolymerizing with said organic resin selected from the group consisting of phenols, formaldehydes, furfuryl alcohol and furfural.

45. The method of claim 44 wherein said monomeric liquid is furfural.

46. The method of claim 44 wherein said amino silane compound is present in said consolidating fluid in an amount in the range of about 0.1 to about 10 parts by weight by 100 parts by weight of said organic resin, and said monomeric liquid is present in said consolidating fluid in an amount in the range of from about 50 to about 150 parts by weight per 100 parts by weight of said organic resin.

47. The method of claim 44 wherein the step of placing a quantity of particulated solids coated with said hardenable organic consolidating fluid into contact with said formation comprises:
combining said consolidating fluid with a first aqueous carrier solution so that a portion of sand consolidating fluid is dissolved in said solution and a portion is dispersed in an immiscible phase in said solution;
introducing a quantity of particulated solids into the consolidating fluid-aqueous carrier solution mixture so that the particulated solids are coated with said consolidating fluid; and
introducing the resultant consolidating fluid-solids-aqueous carrier solution mixture into said formation.

48. The method of claim 47 wherein the step of causing the consolidating fluid to harden comprises contacting said formation with an aqueous solution containing a hardening agent.

49. The method of claim 48 wherein the step of contacting said formation with said hardenable organic consolidating fluid comprises:
combining said consolidating fluid with a second aqueous carrier solution so that a portion of said consolidating fluid is dissolved in said solution and a portion is dispersed in an immiscible phase in said solution; and
introducing the resultant consolidating fluid-aqueous-solution mixture into said formation.

50. The method of claim 49 wherein said preflush solution, said spacer solution, said first and second carrier solutions and said solution containing a hardening agent are comprised of water, a water soluble inorganic salt and a non-emulsifying cationic surface active agent.

51. The method of claim 50 wherein said water soluble inorganic salt is an alkali metal halide, an alkaline earth metal halide, or mixtures thereof, and is present in each of said solutions in an amount in the range of from about 5% to about 20% by weight of said solutions.

52. The method of claim 51 wherein said hardening agent is selected from the group consisting of inorganic acids, organic acids and acid forming chemicals.

53. The method of claim 51 which is further characterized to include the step of controlling the quantitative distribution of said consolidating fluid in said first and second aqueous carrier solutions between the dissolved and dispersed immiscible phases thereof.

54. The method of claim 53 wherein the step of controlling the quantitative distribution of said consolidating fluid in said first and second aqueous carrier solutions between the dissolved and dispersed immiscible phases thereof comprises controlling the quantitative ratio of consolidating fluid to aqueous carrier solution used.

55. The method of claim 54 wherein the step of controlling the quantitative distribution of the consolidating fluid in said first and second aqueous carrier solutions between the dissolved and dispersed immiscible phases thereof is further characterized to include the step of controlling the temperature of the resultant consolidating fluid-aqueous carrier solution mixtures.

56. The method of claim 55 wherein said hardenable organic resin is furfuryl alcohol resin.

57. The method of claim 56 wherein said monomeric resin diluting liquid is furfural.

58. A method of consolidating loose or incompetent sands in a formation penetrated by a well bore comprising the steps of:
contacting said formation with an aqueous preflush solution to condition said formation for the acceptance of a hardenable organic consolidating fluid capable of coating sand in an aqueous environment;
contacting said formation with said hardenable organic consolidating fluid so that at least a portion of loose or incompetent sands are coated thereby;
contacting said formation with a liquid hydrocarbon spacer solution so that said hardenable organic consolidating fluid is distributed therein; and
causing said consolidating fluid to harden thereby forming a hard permeable mass in said formation.

59. The method of claim 58 wherein said consolidating fluid is a liquid composition comprised of a hardenable organic resin and a resin-to-sand coupling agent.

60. The method of claim 59 wherein said hardenable organic resin is selected from the group consisting of epoxy resin, phenol-aldehyde resins, furfuryl alcohol resin, urea-aldehyde resins, and mixtures thereof.

61. The method of claim 60 wherein said hardenable organic resin is furfuryl alcohol resin.

62. The method of claim 60 wherein said coupling agent is an amino silane compound or a mixture of amino silane compounds represented by the following formula:

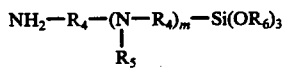

wherein;
$R_4$ is a straight or branched chain alkyl radical having in the range of from about 1 to 4 carbon atoms; $R_5$ is hydrogen, an alkyl amine radical or an alkyl radical wherein the alkyl amine and alkyl radicals have in the range of about 1 to 4 carbon atoms;
$R_6$ is an alkyl radical having in the range of from about 1 to 2 carbon atoms; and '$m$' is an integer in the range of about 1 to 4.

63. The method of claim 62 wherein said amino silane compound is N-beta-(aminoethyl)-gamma-aminopropyltrimethoxysilane.

64. The method of claim 62 wherein said amino silane compound is present in said consolidating fluid in an amount in the range of from about 0.1 to about 10 parts by weight per 100 parts by weight of said organic resin.

65. The method of claim 64 wherein said consolidating fluid is further characterized to include a monomeric resin diluting liquid capable of copolymerizing with said organic resin selected from the group consisting of phenols, formaldehydes, furfuryl alcohol and furfural.

66. The method of claim 65 wherein said organic resin is furfuryl alcohol and said monomeric liquid is furfuryl alcohol.

67. The method of claim 66 wherein said furfuryl alcohol resin-furfuryl alcohol-amino silane consolidating fluid is further characterized to include a dispersing agent selected from a group consisting of furfural, diethyl phthalate and mixtures thereof.

68. The method of claim 67 wherein said dispersing agent is a mixture of furfural and diethyl phthalate.

69. The method of claim 68 wherein the step of causing the consolidating fluid to harden comprises contacting said formation with a liquid hydrocarbon solution containing a hardening agent.

70. The method of claim 69 wherein the step of contacting said formation with said hardenable organic consolidating fluid comprises:
combining said consolidating fluid with a liquid hydrocarbon carrier solution so that a portion of said consolidating fluid is dissolved in said solution and a portion thereof is dispersed in an immiscible phase in said solution; and
introducing the resultant consolidating fluid-hydrocarbon solution mixture into said formation.

71. The method of claim 70 wherein said spacer solution and said carrier solution are each comprised of a liquid hydrocarbon and a non-emulsifying cationic surface active agent.

72. The method of claim 71 which is further characterized to include the step of controlling the quantitative distribution of said consolidating fluid in said liquid hydrocarbon solution between the dissolved and dispersed immiscible phases thereof.

73. The method of claim 72 wherein the step of controlling the distribution of said consolidating fluid between the dissolved and dispersed immiscible phases thereof comprises controlling the quantitative ratio of consolidating fluid to hydrocarbon solution used.

74. The method of claim 73 wherein the step of controlling the quantitative distribution of said consolidating fluid between the dissolved and dispersed phases thereof is further characterized to include the step of controlling the temperature of the resultant consolidating fluid-hydrocarbon solution mixture.

75. A method of consolidating loose or incompetent sands in a formation penetrated by a well bore comprising the steps of:
contacting said formation with an aqueous preflush solution to condition said formation for the acceptance of a hardenable organic consolidating fluid capable of coating sand in an aqueous environment;
placing a quantity of particulated solids coated with said hardenable organic consolidating fluid into contact with said formation so that upon the hardening of said consolidating fluid a hard permeable pack is formed between said formation and said well bore;
contacting said formation with said hardenable organic consolidating fluid so that at least a portion of said loose or incompetent sands are coated thereby;
contacting said formation with a liquid hydrocarbon spacer solution so that said hardenable organic consolidating fluid is distributed therein; and
causing said consolidating fluid to harden thereby forming a hard permeable pack between said formation and said well bore and forming a hard permeable mass in said formation.

76. The method of claim 75 wherein said consolidating fluid is a liquid composition comprised of a hardenable organic resin in a resin-to-sand coupling agent.

77. The method of claim 76 wherein said hardenable organic resin is selected from the group consisting of epoxy resin, phenol-aldehyde resins, furfuryl alcohol resin, urea-aldehyde resins, and mixtures thereof.

78. The method of claim 77 wherein said hardenable organic resin is furfuryl alcohol resin.

79. The method of claim 78 wherein said coupling agent is an amino silane compound or a mixture of amino silane compounds represented by the following formula:

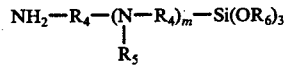

Wherein:
$R_4$ is a straight or branched chain alkyl radical having in the range of from about 1 to 4 carbon atoms: $R_5$ is hydrogen, an alkyl amine and alkyl radicals have in the range of about 1 to 4 carbon atoms; $R_6$ is an alkyl radical having in the range of about 1 to 2 carbon atoms; and "$m$" is an integer in the range of about 1 to 4.

80. The method of claim 79 wherein said amino silane compound is N-beta-(aminoethyl)-gamma-aminopropyltrimethodxysilane.

81. The method of claim 80 wherein said amino silane compound is present in said consolidating fluid in an amount in the range of from about 0.1 to about 10 parts by weight per 100 parts by weight of said organic resin.

82. The method of claim 80 wherein said consolidating fluid is further characterized to include a monomeric resin diluting liquid capable of copolymerizing with said organic resin selected from the group consisting of phenols, formaldehydes, furfuryl alcohol and furfural.

83. The method of claim 82 wherein said organic resin is furfuryl alcohol resin and said monomeric liquid is furfuryl alcohol.

84. The method of claim 83 wherein said furfuryl alcohol resin-furfuryl alcohol-amino silane consolidating fluid is further characterized to include a dispersing agent selected from a group consisting of furfural, diethylphthalate and mixtures thereof.

85. The method of claim 84 wherein said dispersing agent is a mixture of furfural and diethylphthalate.

86. The method of claim 85 wherein the step of causing said consolidating fluid to harden comprises contacting said formation with a liquid hydrocarbon solution containing a hardening agent.

87. The method of claim 86 wherein the step of contacting said formation with said hardenable organic consolidating fluid comprises:

combining said consolidating fluid with a liquid hydrocarbon carrier solution so that a portion of said consolidating fluid is dissolved in said solution and a portion thereof is dispersed in an immiscible phase in said solution; and introducing the resultant consolidating fluid-hydrocarbon solution mixture into said formation.

88. The method of claim 87 wherein said spacer solution and said carrier solution are each comprised of liquid hydrocarbon and a cationic surface active agent.

89. The method of claim 87 wherein the step of placing a quantity of particulated solids coated with said hardenable organic consolidating fluid into contact with said formation comprises:

combining said consolidating fluid with an aqueous carrier solution so that a portion of said consolidating fluid is dissolved in said solution and a portion is dispersed in an immiscible phase in said solution;

introducing a quantity of particulated solids into said consolidating fluid-aqueous carrier solution mixture so that the particulated solids are coated with said consolidating fluid; and introducing the resultant consolidating fluid-solids-aqueous carrier solution mixture into said formation.

90. The method of claim 89 wherein said preflush solution and said aqueous carrier solution are comprised of water and a non-emulsifying cationic surface active agent.

91. The method of claim 90 which is further characterized to include the step of controlling the quantitative distribution of said consolidating fluid in said aqueous carrier solution and said liquid hydrocarbon carrier solution between the dissolved and dispersed immiscible phases thereof.

92. The method of claim 91 wherein the step of controlling the quantitative distribution of said consolidating fluid in said aqueous carrier solution and said liquid hydrocarbon carrier solution between the dissolved and immiscible phases thereof comprises controlling the quantitative ratios of consolidating fluid to aqueous carrier solution and liquid hydrocarbon solution used.

93. The method of claim 92 wherein the step of controlling the quantitative distribution of said consolidating fluid in said aqueous carrier solution and liquid hydrocarbon solution between the dissolved and dispersed immiscible phases thereof is further characterized to include the step of controlling the temperatures of the resultant consolidating fluid-aqueous carrier solution and consolidating fluid-hydrocarbon carrier solution mixtures.

* * * * *

UNITED STATES PATENT AND TRADEMARK OFFICE
CERTIFICATE OF CORRECTION

PATENT NO. : U.S. 4,042,032

DATED : Aug. 16, 1977

INVENTOR(S) : Buddy W. Anderson, Bobby K. Bowles, Joseph R. Murphey, Kenneth D. Totty and Bill M. Young It is certified that error appears in the above-identified patent and that said Letters Patent are hereby corrected as shown below:

Column 1, line 16, the word "generally" is misspelled. Column 3, line 10, after the word "aqueous" insert --carrier--. Column 5, line 65, "urea" is misspelled. Column 8, line 44, after "aqueous" insert the word --carrier--; line 59, the word "be" should read --by--. Column 9, line 37, "be" should read --by--; line 39 "consolidating" is misspelled; and line 68 after the word "aqueous" insert --carrier--. Column 11, line 6, "preventing" should read --prevented--. Column 15, line 2, after "49.5" insert --parts--. Column 16, line 13, "sank" should read --sand--. Table XIII, in the third column, ".0.9" [second occurrence) should read --0.9--. Column 24, line 36, after "said" insert --amino--; line 41, after "0.1" insert --to--. Column 26, line 14, "feom" should read --from--. Column 30, line 64, "propyltrimethodxysilane" should read --propyltrimethoxysilane--.

Signed and Sealed this

Eighth Day of August 1978

[SEAL]

Attest:

RUTH C. MASON
*Attesting Officer*

DONALD W. BANNER
*Commissioner of Patents and Trademarks*